(12) United States Patent
Hobby et al.

(10) Patent No.: US 12,259,318 B2
(45) Date of Patent: Mar. 25, 2025

(54) CHIRPED LASER DISPERSION SPECTROMETER AND METHOD

(71) Applicant: Mirico Limited, Didcot (GB)

(72) Inventors: James Hobby, East Sussex (GB); Damien Weidmann, Berkshire (GB); Richard Kovacich, Oxfordshire (GB)

(73) Assignee: Mirico Limited, Didcot (GB)

( * ) Notice: Subject to any disclaimer, the term of this patent is extended or adjusted under 35 U.S.C. 154(b) by 275 days.

(21) Appl. No.: 17/627,298

(22) PCT Filed: Jul. 16, 2020

(86) PCT No.: PCT/EP2020/070155
§ 371 (c)(1),
(2) Date: Jan. 14, 2022

(87) PCT Pub. No.: WO2021/009289
PCT Pub. Date: Jan. 21, 2021

(65) Prior Publication Data
US 2022/0260486 A1    Aug. 18, 2022

(30) Foreign Application Priority Data
Jul. 16, 2019 (GB) .................... 1910200

(51) Int. Cl.
*G01N 21/3504* (2014.01)
*G01J 3/433* (2006.01)
(Continued)

(52) U.S. Cl.
CPC ........ *G01N 21/3504* (2013.01); *G01J 3/4338* (2013.01); *G01N 21/39* (2013.01); *G01J 2003/423* (2013.01)

(58) Field of Classification Search
CPC .......... G01N 21/6408; G01N 21/6454; G01N 21/645; G01N 21/6458; G01N 21/6402;
(Continued)

(56) References Cited

U.S. PATENT DOCUMENTS

| 7,379,652 B2 * | 5/2008 | Cole | G01J 3/4338 |
| | | | 356/402 |
| RE44,647 E  * | 12/2013 | Iannelli | H04B 10/58 |
| | | | 398/186 |

(Continued)

FOREIGN PATENT DOCUMENTS

| CN | 207557479 U * | 6/2018 | ............. G01S 17/58 |
| WO | WO-03087787 A1 * | 10/2003 | ............. B82Y 20/00 |

(Continued)

OTHER PUBLICATIONS

Krzempek, K. "Laser Physics Letters Performance Characteristics of Narrow Linewidth Fiber Laser Pumped Mid-IR Difference Frequency Mixing Light Source for Methane Detection—Recent citations Kagome Hollow Core Fiber-Based Mid-Infrared Dispersion Spectroscopy of Methane at Sub-ppm Levels", Aug. 24, 2017 (Aug. 24, 2017), XP055733591, Retrieved from the Internet: URL:https://iopscience.iop.org/article/10.1088/1612-202X/aa7d73/pdf.
(Continued)

*Primary Examiner* — Michael P Stafira
(74) *Attorney, Agent, or Firm* — Cook Alex Ltd.

(57) ABSTRACT

The invention provides a chirped laser dispersion spectrometer having two tunable lasers each with a bias current supply, a chirp signal source to provide a matching chirp pattern, a beam splitter to produce a single beam from the two first and second tunable lasers and active-phase locking means to render the two beams phase coherent and to produce a radio frequency carrier signal capable of programmable phase modulation by means of an optical beat signal.
(Continued)

The invention also provides a method for generating at least two optical frequency signals for use in a frequency modulation spectroscopy (FMS) process for the detection and/or measurement of molecular species in a gas mixture and a method for generating at least two optical frequency signals for use in a chirped laser dispersion spectroscopy (CLaDS) process for the detection and/or measurement of molecular species in a gas mixture. The invention provides an efficient and cost-effective CLaDS system which maintains optical modulation whilst enabling greater change of the modulation frequency.

24 Claims, 10 Drawing Sheets

(51) Int. Cl.
  *G01N 21/39* (2006.01)
  *G01J 3/42* (2006.01)
(58) Field of Classification Search
  CPC ....... G01N 21/6486; G01N 2201/0697; G01N 2021/6439; G01N 2021/6441; G01N 21/648; G01N 2021/6419; G01N 2201/0221; G01N 21/3504; G01N 21/39; G01N 21/6452; G01J 2003/423; G01J 3/433; G01J 3/10; G01J 9/0246; G01J 9/04; G01J 3/4338
  See application file for complete search history.

(56) References Cited

U.S. PATENT DOCUMENTS

| | | | | |
|---|---|---|---|---|
| 8,748,822 | B1 * | 6/2014 | Gerecht | G01N 21/3586 250/339.07 |
| 9,784,958 | B2 * | 10/2017 | Rowlette | G02B 21/088 |
| 10,247,538 | B2 * | 4/2019 | Roos | H04B 10/071 |
| 11,604,280 | B2 * | 3/2023 | Roos | G01S 17/931 |
| 2004/0114857 | A1 * | 6/2004 | Yan | H04B 10/5051 385/27 |
| 2012/0262721 | A1 * | 10/2012 | Rakuljic | G01D 5/266 356/477 |
| 2012/0268746 | A1 | 10/2012 | Wysocki et al. | |
| 2012/0274929 | A1 | 11/2012 | Weidmann et al. | |

FOREIGN PATENT DOCUMENTS

| | | | | |
|---|---|---|---|---|
| WO | WO-2016115769 | A1 * | 7/2016 | G02F 2/02 |
| WO | WO-2017214155 | A1 * | 12/2017 | G01B 9/02 |

OTHER PUBLICATIONS

Nikodem,Michal et al. "Remote open-path sensing of nitrous oxide using chirped laser dispersion spectroscopy", Lasers and Electro-Optics (CLEO), 2012 Conference on, IEEE, May 6, 2012 (May 6, 2012), pp. 1-2, KP032246034, DOI: 10.1364/CLEO_SI.2012. CM2F.1 ISBN: 978-1-4673-1839-6.

Nikodem,Michal et al. "Chirped laser dispersion spectroscopy with differential frequency generation source", Optics Letters, Optical Society of America, US, vol. 39, No. 15, Aug. 1, 2014 (Aug. 1, 2014), pp. 4420-4423, XPOO 1590631 , ISSN: 0146-9592, DOI: 10.1364/0L.39.004420.

Nikodem M et al. "Methane sensing at 3.4[mu]m using chirped laser dispersion spectroscopy with DFG so", 2013 Conference on Lasers & Electro-Optics Europe & International Quantum Electronics Conference CLEO Europe/IQEC, IEEE, May 12, 2013 (May 12, 2013), p. 1, XP032588589, DOI: 10.1109/CLEOE-IQEC.2013. 6801188.

Plant, Genevieve B. "Chirped Laser Dispersion Spectroscopy: Fundamentals and Applications", Jan. 1, 2016 (Jan. 1, 2016), XP055734736, Ann Arbor Retrieved from the Internet: URL:https://dataspace. princeton.edu/bitstream/88435/dsp01w66346117/3/gplant_thesis2. pdf.

International Search Report dated Oct. 9, 2020 for International Application No. PCT/EP2020/070155.

UK Search Report dated Dec. 18, 2019 for GB Application No. GB 1910200.3.

CH. Koch, "Bridging THz-Frequency Gaps in the Near IR by Coherent Four-Wave Mixing in GaAlAs Laser Diodes," Opt. Comm., Aug. 1, 1992, pp. 371-376, vol. 91—issue 5,6.

E.H. Armstrong, "A Method of Reducing Disturbances in Radio Signaling by a System of Frequency Modulation," Proceedings of The Institute of Radio Engineers, May 1936, pp. 689-740, vol. 24—issue 5.

G. Ascheid and H. Meyr, "Cycle Slips in Phase-Locked Loops: A Tutorial Survey," IEEE Trans. Comm., Oct. 1982, pp. 2228-2241, vol. 30—issue 10.

G. Wysocki and D. Weidmann, "Molecular Dispersion Spectroscopy for Chemical Sensing Using Chirped Mid-Infrared Quantum Cascade Laser," Optics Express, Dec. 6, 2010, p. 26123-40, vol. 18—issue 25.

H.R. Telle, "Chapter 5: Absolute Measurement of Optical Frequencies," Frequency Control of Semiconductor Lasers, 1996, pp. 137-172.

H.R. Telle, "Stabilization and Modulation Schemes of Laser Diodes for Applied Spectroscopy," Spectrochimica Acta Rev., 1993, pp. 301-327, vol. 15—issue 5.

K. Mohan et al., "Characterization of Lineshape Structure by Wavelength Modulation Spectroscopy," Appl. Phys. B, Oct. 19, 2010, pp. 569-578, vol. 102—issue 3.

M. Ohtsu, "Chapter 5: Optical Phase Locking and Frequency Sweep," Highly Coherent Semiconductor Lasers, 1991, pp. 145-172.

M. Nikodem et al., "Chirped Lasers Dispersion Spectroscopy Implemented with Single- and Dual-Sideband Electro-Optical Modulators," Optics Express, Jun. 13, 2013, pp. 14649-55, vol. 21—issue 12.

M. Nikodem, "Chirped Laser Dispersion Spectroscopy for Laser-Based Hydrogen Sulfide Detection in Open-Path Conditions," Optics Express, Apr. 19, 2016, pp. 878-884, vol. 24—issue 10.

V. Avetisov and P. Kauranen, "High-Resolution Absorption Measurements by use of Two-Tone Frequency-Modulation Spectroscopy with Diode Lasers," Applied Optics, Jun. 20, 1997, pp. 4043-4054, vol. 36—issue 18.

* cited by examiner

CHIRPED LASER DISPERSION SPECTROMETER AND METHOD

CROSS-REFERENCE TO RELATED APPLICATIONS

This is a U.S. National Stage of International PCT Application No. PCT/EP2020/070155, filed Jul. 16, 2020 which claims the benefit of priority to Great Britain Application No. 1910200.3, filed Jul. 16, 2019, the disclosures of which are hereby incorporated by reference in their entireties.

This invention relates to a method for generating at least two optical frequency signals for use in a chirped laser dispersion spectroscopy process for detecting one or more species in a sample, to apparatus therefor and to use of a spectrometer in Zeeman spectroscopy, Faraday spectroscopy or Stark Effect spectroscopy. The invention particularly relates to a chirped laser dispersion spectrometer and a method for the detection and measurement of molecular species in a gas mixture or the atmosphere.

The use of laser spectrometers in gas analysis and gas detection is now widespread in a variety of commercialised industrial, environmental, and safety applications, with growing interest within these fields in applying laser gas analysis to new applications. However, several technical and commercial challenges remain. Most laser spectrometers use some form of direct absorption spectroscopy or wavelength modulation spectroscopy, which all rely on measuring small amplitude variations of the laser beam intensity due to optical absorption of the molecular species from some form of molecular excitation, such as a roto-vibrational transition in the mid-infrared or near-infrared. These techniques typically have limitations due to dynamic range and non-linear signal behaviour at high mole fractions of the measurand (target molecular species).

Non-linear behaviour is particularly undesirable in safety applications as an excessive increase in the measurand mole fraction above the laser gas analyser alarm level may result in signal turnover and result in a false negative condition. This signal behaviour for second harmonic wavelength modulation spectroscopy has been studied by K. Mohan, M. A. Khan, and A. N. Dharamsi "Characterisation of lineshape structure by wavelength modulation spectroscopy" Appl. Phys. B, vol 102, pp 569-578, and they show how the peak that is commonly used in laser spectrometer signal processing starts to collapse at high absorption strength by the measurand i.e. the system in no longer said to be in the "optically thin" regime.

The dynamic range of signal detection in absorption based laser spectrometers may be limited by the signal-to-noise ratio of the photodetector system. Typically, this is worse in the presence of a large background signal (as in direct absorption spectroscopy) or residual amplitude modulations and distortions (as in wavelength modulation spectroscopy). In applications where there is significant beam intensity reduction or variation, for example due to high levels of dust, beam misalignment, or beam aperture, the noise becomes a significant limiting factor. Although increasing the gain of the photodetector system may improve the signal-to-noise if limited by certain electronic noise in the photodetector system (rather than the incident photon shot noise) as the case in many practical commercial systems, this may be constrained by clipping of the signal. In some laser spectrometers the feature of auto-gain may be implemented to avoid clipping, but the dynamic range may not be truly continuous and may exhibit gain switching errors within, and variable noise for the different gain settings. Providing a wide continuous dynamic range with a fundamentally low noise level throughout is desirable.

Chirped laser dispersion spectroscopy (CLaDS) and variants thereof, such as chirped modulation chirped laser dispersion spectroscopy (CM-CLaDS), instead measure frequency variations due to the refractive index change caused by dispersion from an optical absorption line of the measurand, which is probed by at least two optical frequencies that may be obtained by suitable modulation and chirping of a coherent optical source. A typical implementation is shown by G. Wysocki and D. Weidmann, "Molecular dispersion spectroscopy for chemical sensing using chirped midinfrared quantum cascade laser", Opt. Express, vol 18, pp 26123-26140. Although midinfrared laser sources are a preferred choice to probe the strongest absorption lines of various molecular species of industrial and environmental interest to obtain a strong detection signal and high mole fraction sensitivity, the CLaDS technique can be used with other coherent optical sources, such as near infrared laser diodes, which may be more suitable for certain applications and commercial requirements as studied by M. Nikodem "Chirped laser dispersion spectroscopy for laser-based hydrogen sulphide detection in open-path conditions" Opt. Express, vol 24, pp 878-884. In all cases of CLaDS implementation to date, an external optical modulator is required to generate the two (or more) optical frequencies needed to measure the dispersion signal, which is generated by mixing in a suitable receiving photodetector to produce an electrical signal that has a nominal frequency equal to the external optical modulation frequency. This optical beat signal becomes in effect a carrier signal that will experience frequency modulation (FM) proportional to the laser chirp rate across the measurand absorption line and the dispersion, which is proportional to the measurand mole fraction. An acousto-optic modulator (AOM) is typically used, but the use of electro-optical modulators has been demonstrated by M. Nikodem et al, "Chirped laser dispersion spectroscopy implemented with single- and dual-sideband electro-optical modulators" Opt. Express, vol 21, pp 14649-14655.

The CLaDS system noise performance is determined by its ability to resolve the frequency modulation on the carrier signal, and relatively small frequency changes can be measured routinely using techniques that are known in the field of radio communication, such as synchronous frequency demodulation. Compared to amplitude detection methods used in absorption laser spectrometers, frequency modulation detection with appropriate bandwidth and filtering is more resilient to large beam intensity variations that are normally encountered in open path gas detection and dust laden process gas analysis applications, which is analogous to overcoming noise in radio communication systems that led to the invention of wideband frequency modulation detection techniques in the first place by E. H. Armstrong "Method of reducing disturbances in radio signalling by a system of frequency modulation" IRE vol. 24, pp 689-740. This is effective since most environmental perturbations cause amplitude changes of the signal rather than phase changes. Although beam intensity variations can be compensated in absorption laser spectrometers by a variety of methods, the direct dependence of an amplitude modulation signal to beam intensity ultimately leads to noticeable errors in the compensation and additional noise. Therefore, CLaDS systems can achieve low mole fraction detection limits as high carrier-to-noise ratios (CNR) are achieved by the combination of low FM detection noise and a large carrier signal, which can be produced using high laser chirp rates amenable to semiconductor laser sources and strong measurand absorption lines in the midinfrared. This enables a large continuous measurement dynamic range with fixed photodetector gain.

Unlike absorption laser spectrometers CLaDS does not exhibit non-linear signal behaviour due to Beer-Lambert absorption law, since the refractive index change from dispersion is not influenced by the propagating beam intensity below the critical field strength need for self-focusing in the medium, which is extremely high in comparison to beam intensities normally used for measurements in air. This fundamental linear behaviour is advantageous in many applications, such as safety applications overcoming the risk of turnover behaviour that can occur in absorption laser spectrometers, and long open path gas detection applications where the signal from a fugitive gas emission plume may vary considerably depending on the plume size and orientation to the beam e.g. due to wind direction. Note that the large measurement dynamic range of CLaDS allows it to work well across the "optically thin" and "optically thick" absorption regimes.

As CLaDS fundamentally exploits a differential phase measurement related to dispersion of the measurand, it provides additional advantages that particularly benefit open path measurement applications: Significant amplitude noise can occur due to turbulence in the atmosphere that the beam propagates through, especially across very large distances, which is also known as scintillation. At a fundamental level this noise cannot self-cancel in an absorption based laser spectrometer since gas absorption line functions have symmetric parity (positive signed either side of the absorption peak) and therefore produce a direct dependence on beam intensity variations. Whereas in CLaDS the dispersion function has antisymmetric parity, which allows self-cancellation of this scintillation effect; for low mole fraction detection of the measurand a zero baseline signal is essential and this is also provided by CLaDS without requiring subtraction of a large measured signal that may be unstable or comparatively noisy as in absorption based laser spectrometers. This is due to the antisymmetric parity of the dispersion function as the gas absorption line peak corresponds to a fundamental zero frequency (or phase) change of the CLaDS signal, provided the optical system is balanced.

Whilst advantageous relative to absorption laser spectrometers, the use of an external optical modulator adversely impacts the size, cost, power consumption, and complexity of CLaDS systems, which is a barrier to its use in new applications where these factors are important. It may also be a significant source of optical interference noise, and to a lesser extent phase and amplitude modulation noise. Although photonic integrated circuit (PIC) technology can assist in the implementation of CLaDS, only a few types of modulator are available for PICs in the near infrared, and midinfrared PIC technology suitable for commercial production is not yet developed. Furthermore, acousto-optical and electro-optical modulators often rely on resonant electric excitation to generate the power and voltage necessary to produce adequate optical modulation.

Consequently, the modulation frequency cannot be changed greatly without degradation of the optical modulation, and this constrains the modulation frequency possibilities in CLaDS. A need remains to provide an efficient and cost-effective CLaDS system which maintains optical modulation whilst enabling greater change of the modulation frequency.

We have now found that limitations of using external optical modulators in CLaDS may be reduced or overcome by generating the two (or more) optical frequency signals required for CLaDS by using at least two coherent optical sources that are actively phase locked. This concept shall be referred to herein as optical phased locked CLaDS, or OPL-CLaDS.

In a first aspect, the invention provides a chirped laser dispersion spectrometer comprising:
  a first tunable laser for providing a first beam at a first wavelength;
  a second tunable laser for providing a second beam at a second wavelength;
  a bias current supply for the first tunable laser and a bias current supply for the second tunable laser and a chirp signal source for the first and second tunable lasers to provide a matching chirp pattern;
  a beam combining optical element, preferably a beam splitter to produce a single beam from the first and second tunable lasers;
  active-phase locking means to render the phases of the first and second beams coherent with each other and to produce at least one radio frequency carrier signal capable of programmable phase modulation by means of an optical beat signal, preferably a heterodyne or homodyne beat signal.

In a second aspect, the invention provides a method for generating at least two optical frequency signals for use in a chirped laser dispersion spectroscopy (CLaDS) process or a in a frequency modulation spectroscopy (FMS) process for the detection and/or measurement of molecular species in a gas mixture, the method comprising:
  providing a first laser beam at a first wavelength from a first tunable laser and a second laser beam at a second wavelength from a second tunable laser;
  providing a bias current supply for the first tunable laser and a bias current supply for the second tunable laser and a chirp signal source for the first and second tunable lasers to provide a matching chirp pattern;
  actively-phase locking the first and second tunable lasers so as to render the phases of the first and second beams coherent with each other and to produce at least one radio frequency carrier signal capable of programmable phase modulation by means of an optical beat signal, preferably a heterodyne or homodyne beat signal.

The invention also provides a use of a spectrometer according to the invention in Zeeman spectroscopy, Faraday spectroscopy or Stark Effect spectroscopy wherein the beam combining optical element, preferably a beam splitter, is polarization sensitive and is configured to produce modulation of the combined beam polarization state.

Preferably, the method for generating at least two optical frequency signals according to the second aspect of the invention comprises the step producing a single beam from the first and second tunable lasers, preferably by means of a beam splitter.

The first tunable laser is referred to herein as a "master laser" and the second tunable laser is referred to herein as a "slave laser".

Reference herein to "matching chirp pattern" is to be interpreted in a practical rather than literal sense having regard to instrumental variation or errors and to mean being sufficiently matched to perform the intended function required in providing a matching chirp pattern and the chirp being common to the first and second lasers.

The bias current supply for the first tunable laser and the bias current supply for the second tunable laser may be provided by independent bias current supplies but is preferably provided by a common bias current supply for the first and second tunable lasers.

For the purpose of this invention the term "beam splitter" refers to any optical element, for example a partial reflector, that produces a partially reflected (or evanescently coupled) beam and a partially transmitted (or coupled) beam sharing a common interference point.

The term "beam splitter" as employed herein includes, but is not limited to, beam combiners and beam samplers.

Although inherent noise sources within a laser may produce significant frequency noise that is characterised by its emission line width, which may be several MHz for a distributed feedback (DFB) laser diode, a CLaDS system is still able to resolve very small frequency deviations since the noise self-cancels in the optical beat signal, which has a frequency $\Omega$ equal to the AOM frequency. This is because the optical frequency signals from the AOM originate from one laser, and therefore all have the same phase coherence and noise. If instead two independent lasers are used, with one frequency detuned by $\Omega$ from the other to try and reproduce the optical frequency signals that would be produced by an AOM, then the noise will not self-cancel and the optical beat note signal will carry the emission line width of both lasers, as the phase and noise of each laser is independent. To restore the phase coherence between the two lasers in this invention, it is necessary to "phase lock" one laser to another.

Techniques for the phase locking of lasers are known in the field of optical frequency metrology and related applications, for example, as reviewed by M. Ohtsu "Highly Coherent Semiconductor Lasers" Artech House Publishers. One technique comprises the use of negative electronic feedback preferably comprising a digital or analogue electronic system. Another technique comprises optical injection. Advantageously, negative electronic feedback allows fast frequency modulation by variation of the bias current, which can be used to correct the phase fluctuations that is detected in the optical beat signal between the two lasers, and after processing by a feedback loop filter. In a heterodyne optical phase locked loop (OPLL) system a reference frequency source at $\Omega$ may be added into a mixer after the photodetector to offset the frequency between the lasers, thereby reproducing the optical frequency signals in CLaDS with the necessary phase coherence and low noise. To obtain high phase coherence, and hence low frequency noise, the bandwidth of the OPLL control is suitably large enough to correct the emission line width of the otherwise "free running" lasers. The negative electronic feedback system for the OPLL may be implemented using analogue or digital devices, such as a field programmable logic array (FPGA).

To determine the necessary OPLL control bandwidth to allow the measurement of small frequency deviations (say to the level of 1 Hz) consideration should be given to the error in a phase locked loop due to the CNR, which is characterised by the rate of cycle slips. This has been considered by H. R. Telle "Absolute measurement of optical frequencies" in "Frequency Control of Semiconductor Lasers" John Wiley and Sons, which shows an exponential relationship between the CNR and the mean time between cycle slips. It is also dependent on the control loop bandwidth, type of loop filter, and phase noise spectral density of the lasers. Since the CNR is equal to the reciprocal of the phase error variance in the OPLL, suitably the phase error variance is reduced below 1 radian^2, and therefore the control loop bandwidth must be in the order of the emission line width of the free running lasers. This is typically a few MHz for many semiconductor lasers, such as near infrared distributed feedback (DFB) laser diodes, mid infrared quantum cascade lasers and interband cascade lasers, that are preferred due to their compact size, low power requirement, and room temperature operation. Suitably, an OPLL using a semiconductor laser requires fast frequency control, which is conveniently achieved by varying the bias current that powers it. However, the speed of the bias current frequency control or modulation is limited by the thermal response of the semiconductor laser junction that is typically in the order of several microseconds. In addition to limiting the frequency control speed it also introduces significant a frequency dependent phase delays in the OPLL, which often needs compensation by the OPLL filter that may be more complex than a simple proportional-integral-difference filter normally used in control loop systems. Some semiconductor laser OPLL systems may need a higher control bandwidth than allowed by the bias current response, so other means of laser frequency control must be used, such as optical injection modulation using non-interfering light.

The laser frequency is suitably chirped rapidly to produce a strong CLaDS signal, and the chirp for the two lasers must be identical to avoid errors in the CLaDS signal. Although the OPLL can in principle track the chirp waveform if applied to the master laser alone, the chirp waveform may be too fast for the OPLL control bandwidth or have features than cannot be tracked and therefore become distorted by the OPLL filter response. To avoid these problems the chirp waveform is applied in this invention using a current driver circuit that shares a common current bias between the two lasers. This ensures both lasers have identical chirp by means of effective feedforward control. The common bias current supply path also allows common mode rejection of the bias current noise produced in the circuit as it will self-cancel in the CLaDS signal (provided the current tuning characteristics of both lasers are equal). The bias current noise can be a significant source of frequency noise above the inherent frequency noise of the laser, particularly for quantum cascade lasers that require bias currents of at least several 100 milliamps, so such means of reducing this technical noise is important.

In an embodiment of the invention, the first tunable laser may be adapted to be modulated at a frequency much less than the carrier radio frequency resulting in a comb of sideband frequencies, and further comprising a photodetector that detects an optical homodyne beat signal for negative electronic feedback.

Where the phase locking technique comprises optical injection, the first tunable laser may be an optically isolated master laser that is modulated at a frequency much less than the carrier radio frequency resulting in a comb of sideband frequencies and the second tunable laser is suitably a slave laser that is tuned to optically injection lock onto one of the master laser sideband frequencies or that generated in combination with nonlinear mixing effects within the slave laser.

The chirped laser dispersion spectrometer according to the invention suitably comprises a second modulation source. Suitably, the second modulation source has a frequency less than the noise bandwidth of the negative electronic feedback loop and modulates the radio frequency reference.

Other embodiments of the OPL-CLaDS system may include an additional modulation source, or a programmable modulation source such as a direct digital synthesis (DDS) device in place of the reference frequency source $\Omega$, which then allows the possibility of more complex modulation schemes than possible with CLaDS using an external modulator, that is a "multi-modulation" capability. This allows the optical frequency signals from OPL-CLaDS to specifically optimise different aspects of the CLaDS signal, such as the amplitude modulation and frequency modulation components separately, and even digital modulation techniques such as quadrature phase shift keying (QPSK). Additionally, it may provide a sub-modulation $\delta$ on the carrier frequency $\Omega$ which creates optical frequency sidebands at $\Omega \pm \delta$, provided $\delta$ is within the control bandwidth of the OPLL. This sub modulation may be detected in the CLaDS signal, akin to two-tone frequency modulation spectroscopy. If $\delta$ exceeds the control bandwidth of the OPLL, it may instead be applied directly to one of the lasers via bias current modulation or optical injection. If the modulation depth is sufficient to create a harmonic comb of optical frequencies, then the OPLL can operate on a sideband lock such that an integer number of $\delta$ equals the intended $\Omega$ frequency difference between the lasers. This then allows homodyne detection at the OPLL input, which can use a low speed photodiode.

An OPLL can also be implemented using optical injection locking, which is a further embodiment of OPL-CLaDS. In this embodiment a "master" laser that is modulated to produce a single sideband of $\Omega$ or a harmonic comb of $N \cdot \delta$ is coupled via an optical isolation system to inject a "slave" laser that effectively amplifies the selected sideband and signal. An important aspect of optical injection locking is the frequency locking range, which is the maximum frequency detuning that can be tolerated before the lasers unlock, and this is proportional to the square root of the coupling strength of the master laser signal and the photon decay rate in the slave laser. Therefore, a very small amount of power can be used for optical injection locking. This avoids the need for additional electronics which may reduce the OPL-CLaDS complexity.

The beam path difference of the two lasers to the beam combining optical element, preferably beam splitter, also affects the phase coherence, and perturbations such as air turbulence or vibration will introduce small phase errors, which can be minimised by balancing the path lengths. However, it can also be used to apply frequency modulation by placing a fast mechanically actuated mirror; such as a piezoelectric element; in the master laser beam path. The use of a deformable mirror will allow spatial beam profile modulation, which provides benefit for an open path CLaDS system.

A chirped laser dispersion spectrometer according to the invention may further comprise an alignment laser visible by unaided eye or camera, as desired.

In another embodiment, the chirped laser dispersion spectrometer of the invention may further comprise Bragg grating devices to reduce the emission linewidth of the lasers by constructive optical feedback reflection.

OPL-CLaDS may be extended using the polarisation properties of the lasers, so that the multi-modulation scheme can be used to modulate the polarisation state of the combined beam from the OPLL. Although the optical beat signal at the photodiode requires the beams to have the same polarisation, there is ample CNR to use just a small projection of one laser's polarisation state to produce the optical beat signal. A modulating polarisation state may find application in Zeeman, Faraday, and Stark effect spectroscopy of suitably sensitive molecular species.

OPL-CLaDS may also be extended using additional lasers so that several optical frequency signals are produced having phases coherent with each other, so that an alternate modulation scheme comprising at least two modulation sidebands, for example double sideband modulation and more complex schemes, may be created with frequency spacings of $\Omega$ or greater, for example, using a daisy chain arrangement of cascaded OPLLs. If this also contains an optical injection OPLL stage there is the possibility of inducing four-wave mixing in the slave laser by strong injection coupling, thereby creating a wide optical frequency comb suitable for frequency comb spectroscopy.

With the absence of an external modulator using OPL-CLaDS the system is suited to PIC technology, as semiconductor lasers, photodiodes, and beam splitter/combiner waveguides are routinely integrated in such systems, which are well advanced for use in the near infrared spectrum. Equivalent PIC technology for the midinfrared is forthcoming using different material systems, and OPL-CLaDS will be a good candidate application in future.

Although CLaDS is primarily used to retrieve the dispersion spectroscopy signal it is also capable, to those skilled in the art, of retrieving the absorption spectroscopy signal. This absorption signal is equivalent to that of conventional frequency modulation spectroscopy (FMS) and variations thereof, such as two-tone frequency modulation spectroscopy, which has a practical benefit of allowing a lower bandwidth photodetector, as described by V. Avetisov "High-resolution absorption measurements by use of two-tone frequency-modulation spectroscopy with diode lasers" Applied Optics, vol. 36, pp 4043-4054. The apparatus of the OPL-CLaDS invention and its embodiments may also be used to produce an FMS system, which avoids the need for a high speed external modulator.

The present invention may be implemented in various embodiments that are described by way of example with reference to the following non-limiting figures.

A critical aspect in the implementation of OPL-CLaDS for field applications is maintaining a reliable phase lock between the two lasers, with sufficiently low residual phase noise to allow the resulting CLaDS signal and its signal processing to achieve low mole fraction detection of the measurand. The techniques necessary to overcome the technical noise and drift effects in the system for successful implementation of OPL-CLaDS is disclosed in the various embodiments of this invention.

Figure 1:
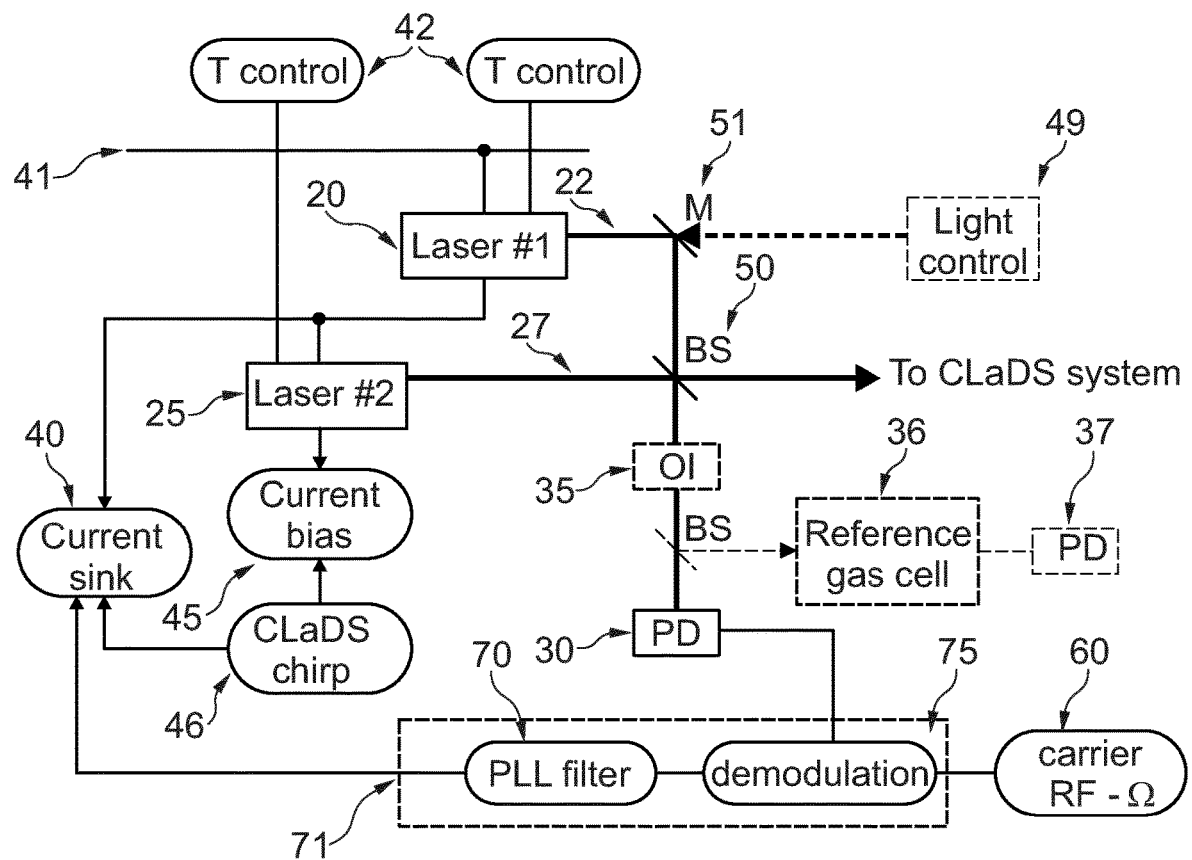
FIG. 1 shows a diagram of the OPL-CLaDS system invention using heterodyne phase locking by negative electronic feedback.

In the first embodiment shown in FIG. 1 two lasers 20, 25 are combined by a beam splitter 50, which directs a combined beam towards a CLaDS detection system, which may be in the form of an open path system, a gas cell system, or a probe system, for example, as disclosed in US20120274929. To ensure that the lasers 20,25, which are typically semiconductor lasers such as quantum cascade lasers, interband cascade lasers, DFB laser diodes, or vertical cavity surface emitting lasers (VCSELs), are tuned to the absorption line of the measurand the temperatures of laser 20 and laser 25 are independently controlled by temperature controllers 42. This relies on the temperature tuning rate of the lasers 20,25 to achieve this within the manufactured wavelength tolerance of the laser, and the technique is well known to those in the field of laser spectroscopy.

Figure 3:
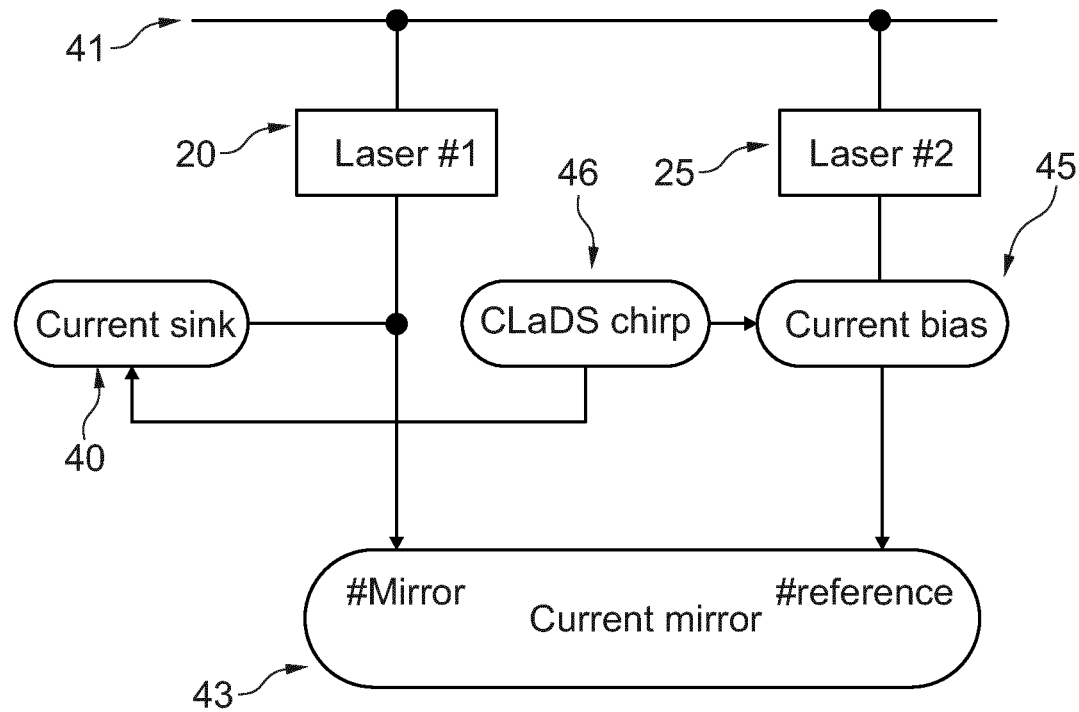
FIG. 3 shows a diagram of an alternative embodiment of the shared bias current scheme for the lasers based on a current mirror system.

The frequency of a semiconductor laser is also dependent on its bias current and therefore any noise in the bias current supply 45 will add frequency noise and increase its emission linewidth, which can be significant for lasers that have very high current tuning coefficients, such as VCSELs, or those requiring high bias current, such as quantum cascade lasers. To overcome this in the invention the lasers 20,25 are connected in series from a supply rail 41 to a common bias current supply 45. Therefore, both lasers see the same current fluctuations and produce the same phase shift (given the lasers will have similar current tuning coefficients), which results in common mode rejection of the current noise that would otherwise degrade the phase coherence between the lasers 20,25 and appear in the optical beat signal at the beam splitter 50. Current modulation of a slave laser 20 is achieved using a current sink 40, which does not affect the other laser 25 as the current bias supply 45 regulates the current within its control bandwidth. In another embodiment of the current bias system, shown FIG. 3, a balanced current between both lasers 20,25 is created by a current mirror circuit 43 that has regulated bias current connection for the master laser 25, and a current mirror connection for the slave laser 20. A current sink 40 is again used to apply modulation to the slave laser 20. The details of the current mirror circuit 43 are known to those in the field of electronics, and the best common mode rejection performance is achieved using a super matched transistor pair.

It is necessary to apply a laser frequency chirp common to both lasers 20,25 to generate the CLaDS signal, and this is done via the common current bias supply 45 using a chirp signal source 46. This signal is typically a sawtooth ramp, but it may take different forms to improve the frequency chirp linearity, its magnitude or other beneficial effect. Although the chirp signal to the lasers 20,25 is matched in ideal circumstances, slight effects in the instrumentation must be considered as the resulting laser frequency chirp must be identical for both lasers 20,25 to avoid significant errors in the CLaDS signal. Although, in principle a chirp signal applied to the master laser 25 alone would be tracked by the OPLL, the chirp signal may either be too fast or have features that cannot be tracked accurately by the OPLL thus leading to distortions, particularly since the loop gain reduces gradually with control speed. Applying the chirp modulation simultaneously in the common bias current scheme provides common mode rejection of such chirp signal errors. The current tuning characteristics of the lasers 20,25 are similar if the same type of semiconductor laser is used, but a small difference may be present which can be adjusted via a correction chirp signal to the current sink 40.

The beam paths 22,27 travelled by the lasers 20,25 may be subject to perturbations such as vibration and air turbulence, and the effect of this on the interference at the beam splitter 50 can be minimised by making the beam paths 22,27 equal in length, which borrows from the principles of white light interferometry. The other port of the beam splitter 50 directs part of the combined beam towards a photodetector 30, which generates an optical beat signal between the two lasers 20,25. To detect the high frequency $\Omega$ optical beat signal the photodetector is a small active area device that requires precise alignment of the beam using a focusing lens or mirror, and this produces a partial reflection that can cause unwanted optical feed back into the lasers 20,25 that are located in close proximity. Although angling the photodetector is a common solution to this problem using larger area photodetectors, it is very difficult to achieve with a small area photodetector due to the precise central alignment needed. To overcome this, an optical isolation system 35 may be added to either suppress or greatly attenuate the partial reflection from the photodetector. The optical isolation system may be a variety of optical components that are known to those in the field of optics.

The combined beams that exit the beam splitter 50 must be highly co-linear and co-planar, which is achieved by precise alignment of the lasers 20,25. With phase coherence between the lasers 20,25 this implies an optical wave front that precisely overlaps at the OPLL photodetector 30 and within the CLaDS detection system. This is an improvement over CLaDS with an external modulator, such as an AOM, where the beams may experience slight misalignment from temperature variations in the external modulator and delay line optics.

The optical beat signal is produced by mixing of the complex electric fields of the light that is incident on the photodetector 30, and this can be written as:

$$E_1 = \sqrt{P_1} \exp[i(\omega_1 t - \varphi_1(t))] \quad \text{Equation 1}$$

$$E_2 = \sqrt{P_2} \exp[i(\omega_2 t - \varphi_2(t))] \quad \text{Equation 2}$$

Where P, $\omega$, and $\varphi$ are respectively the optical power, optical frequency, and slow varying phase of the fields. Thus, the beat signal that is present at the input of the demodulator 75 is given by:

$$V_{RF} \propto 2\sqrt{P_1 P_2} \cos[(\omega_1 - \omega_2)t - (\varphi_1(t) - \varphi_2(t))] \quad \text{Equation 3}$$

Figure 2:
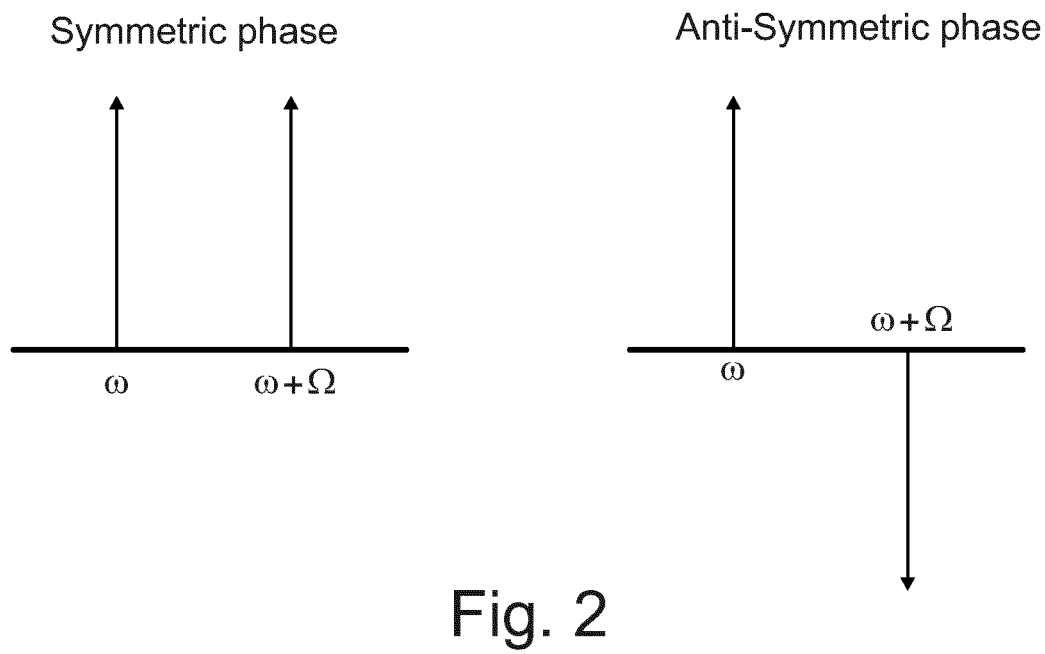
FIG. 2 shows a diagram of the optical frequency signals produced by the invention for different phase parity configurations.

In a homodyne OPLL this signal would feed directly into the control loop filter 70 to provide the OPLL phase error signal, and this forces identical laser frequencies and phase, that is, $\omega 1 = \omega 2$ and $\varphi 1(t) - \varphi 2(t)$ by action of the control loop feedback. However, to perform CLaDS a frequency difference that is comparable to the absorption line width of the measurand is required, and this is achieved by implementing a heterodyne OPLL where the demodulator 75 mixes a local radio frequency (RF) signal 60 that defines the CLaDS signal carrier frequency of $\Omega$. This produces an effective single side band optical modulation scheme, which is illustrated in FIG. 2 where the magnitude of optical signals is represented by the length of the lines and the direction above or below the horizontal axis represents positive or negative phase. Thus, the OPLL may be configured to produce a symmetric or antisymmetric single side band modulation scheme. The relative phase to the optical carrier signal $\omega = \omega 2$ may be adjusted by the phase $\varphi \Omega(t)$ of the local radio frequency signal 60. The demodulator may use an analogue mixing device or the pulse width output of a digital phase comparator. For this heterodyne OPLL the phase error signal from the output of the demodulator 75 is:

$$V_{IF} \propto 2\sqrt{P_1 P_2} V_{LO} \cos[(\omega_1-\omega_2-\Omega)t-(\varphi_1(t)-\varphi_2(t)-\varphi_\Omega(t))] \qquad \text{Equation 4}$$

where $V_{LO}$ is the radio frequency signal 60 strength. The phase error signal then passes into the control loop filter 70 which generates a phase error correction signal for the slave laser 20 that forces $\omega_1-\omega_2=\Omega$, and $\varphi_1(t)-\varphi_2(t)=\varphi_\Omega(t)$. As the control loop filter 70 and laser modulation response has finite gain and speed of response, some residual phase error will remain in the OPLL, which will transfer into the CLaDS signal and therefore limit the smallest frequency deviation and mole fraction of measurand that can be detected by the OPL-CLaDS system. The residual phase noise in the OPLL is given by the free running phase noise of the lasers reduced by the control loop gain, which is characterised by a closed loop transfer function H(f) that includes the contribution of all the components in the signal chain, which is usually dominated by the control loop filter 70 and the slave laser 20 modulation response. In terms of noise power spectral density the residual phase noise spectral density is given by:

$$S_\varphi(f) = \frac{S_1(f) + S_2(f)}{f^2} |1 - H(f)|^2 \qquad \text{Equation 5}$$

Where $S_1(f)$, $S_2(f)$ is the laser frequency noise spectral density that is independent between the lasers 20, 25, and f is the noise frequency that would be measured from the carrier frequency. In the highly simplified case of white frequency noise there is a distinct relationship between the laser emission line width and the laser frequency noise $S_0^v$ which is given by:

$$\Delta v = \pi S_0^v \qquad \text{Equation 6}$$

The ability of the OPLL to accurately track the master laser 25 and allow precise measurement of the CLaDS signal frequency variation can be characterised by the rate of cycle slipping in the OPLL. For a second order control loop that is typically be used in such systems G. Ascheid and H. Myer "Cycle slips in phase-locked loops: a tutorial survey" IEEE Trans. Comm. vol 30 pp 2228-2241 have shown the mean time between cycle slips in the limit of low phase noise and using a demodulation phase detector with $\pm\pi$ radian detection range is approximately given by:

$$T_s = \frac{1}{BW} \exp\left(\frac{0.6}{\sigma_\varphi^2}\right) \qquad \text{Equation 7}$$

where BW is the noise bandwidth of the loop that is equal to the integral of $|H(f)|^2$, and $\sigma_\varphi^2$ is the residual phase error variance in the OPLL which is also equal to the inverse CNR value:

$$\frac{1}{CNR} = \sigma_\varphi^2 = \int_0^\infty |H(f)|^2 S_\varphi(f) df \qquad \text{Equation 8}$$

For a simple second order OPLL using a standard proportional-integral circuit as the control loop filter 70, it can be shown that the residual phase error variance is equal to:

$$\sigma_\varphi^2 = \frac{3\pi(\Delta v_1 + \Delta v_2)}{8 BW} \qquad \text{Equation 9}$$

Where $\Delta v_1$, $\Delta v_2$ are respectively the emission line widths of the slave laser 20 and master laser 25, which are approximately equal if the same type of laser is used. Phase coherence is achieved if the residual phase error variance is less than 1, and this implies that the noise bandwidth of the OPLL must be at least 1.2 times the sum of the laser line widths. However, to reduce the cycle slipping rate to a level adequate for precise frequency counting much higher noise bandwidths are required to increase the CNR. Consider the case of using a semiconductor laser with 1 MHz emission line width; although a noise bandwidth of 2.4 MHz will achieve phase coherence, to make the mean cycle slipping time greater than the typical CLaDS signal scanning time of 10 μs one requires a noise bandwidth of 21 MHz. This bandwidth requirement can be reduced by increasing the detection range of the phase detector, for example, by using a digital phase comparator that allows $\pm 2\pi$ radians, and in this case a noise bandwidth of 9 MHz is enough.

Such frequency modulation bandwidths are possible by direct bias current modulation in semiconductor lasers, however, the frequency modulation response reduces as the thermal junction time constant limit of the device is approached. This leads to a correspondingly large phase change in the frequency modulation response due to the transition from thermal effect to charge carrier density effect (that is weaker), and this limits the noise bandwidth of the OPLL due to phase margin stability limit of the control loop. This can be compensated slightly using a lead compensator circuit in the OPLL system. Alternatively, one may use a novel approach demonstrated by H. R. Telle "Stabilization and modulation schemes of laser diodes for applied spectroscopy" Spectrochimica Acta rev. vol 15 pp 301-327, which avoids this frequency modulation response phase change by using non-interfering light injection into the slave laser 20 from an external laser in a light control system 49 that alters the charge carrier density in the slave laser 20 by optically pumping. This modulation method is only limited by the photon and carrier lifetime in the semiconductor junction, so is extremely fast and free of phase variation, as it relies on the intensity of the optical pumping from the light control system 49. Since the intensity modulation response of most semiconductor laser diodes is flat up to the relaxation frequency, very high frequency modulation bandwidths can be achieved by this method in principle. The wavelength of the light control system 49 laser is not specific as it is only required for optical pumping, so economic devices can be chosen.

The demodulator 75 and loop filter 70 may be individual sections, which is often the case when analogue components are used. However, these functions may be combined into a single FPGA 71 system, which also has the benefit of allowing more complex compensation filters for the laser modulation.

To allow initial phase lock during the OPL-CLaDS instrument start up, the OPLL must have a frequency capture range large enough to bring the optical beat signal of the free running lasers 20,25 into lock. In practice the limitation is not the OPLL, which is ultimately limited by the photodetector bandwidth, but instead from wavelength drift of the lasers 20,25 that may be due to temperature control limitations (from ambient temperature variations) or ageing effects in the lasers 20,25. This wavelength drift may be corrected using the signal from an optional sealed gas reference cell 36, which is detected by a separate photodetector 37, and since this can use the simple absorption signal of the measurand or a surrogate molecular species with high mole fraction, the photodetector 37 can be an economical low speed device.

The invention also allows the combined output beam to have variable polarization if the lasers 20,25 are mounted with their polarization orthogonal to each other. The phase coherence created by the OPLL then defines the complex electric fields of the master laser 25 and slave laser 20 as independent polarization vectors, hence:

$$E_{\parallel} = \sqrt{P_1} \exp[i(\omega_1 t - \varphi_1(t))]$$

$$E_{\perp} = \sqrt{P_2} \exp[i(\omega_2 t - \varphi_2(t))] \quad \text{Equation 10}$$

Although generation of the optical beat signal requires mixing of optical fields with the same polarization, a small projection of the laser polarization is enough for the OPLL as very little power is required for a useful shot noise limit, which is given by the following for the weaker beam:

$$CNR_{sh} = \frac{P_1}{h \nu BW} \quad \text{Equation 12}$$

Where $\nu$ is the optical frequency and h is Planck's constant. So, with as little as 1 nanowatt of mid infrared laser power at 3000 cm$^{-1}$ frequency using an OPLL noise bandwidth of 21 MHz, a shot noise limited $CNR_{sh}$ of 790 is achieved that far exceeds the residual phase noise requirement for coherence and cycle slipping.

Figure 4:
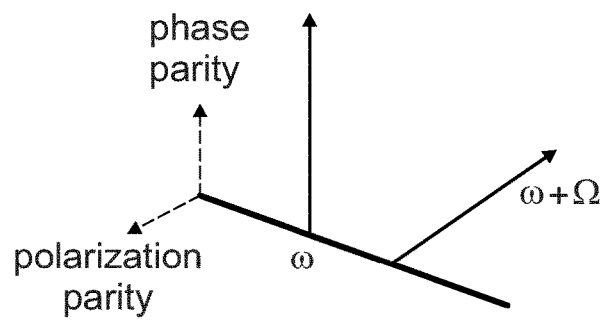
FIG. 4 shows a diagram of the optical frequency signals that can be produced by a polarization sensitive embodiment of the invention with the vertical and out-of-plane axes representing phase and polarization parity.

By adjusting the relative phase $\varphi_1(t) - \varphi_2(t)$ of these polarization vectors E and E the overall polarization of the combined beam from the beam splitter 50 can be defined and hence be polarization modulated. Note that the beam splitter 50 in this embodiment must be non-polarization sensitive. Such polarization modulation will find use in CLaDS using the Zeeman, Faraday, or Stark effects to improve the sensitivity and selectivity for suitably sensitive molecular species, such as nitric oxide (NO) that has a permanent magnetic dipole. The OPL-CLaDS modulation scheme depicted in FIG. 2 can now be extended with the addition of polarization as a third dimension that is illustrated in FIG. 4.

Figure 5:
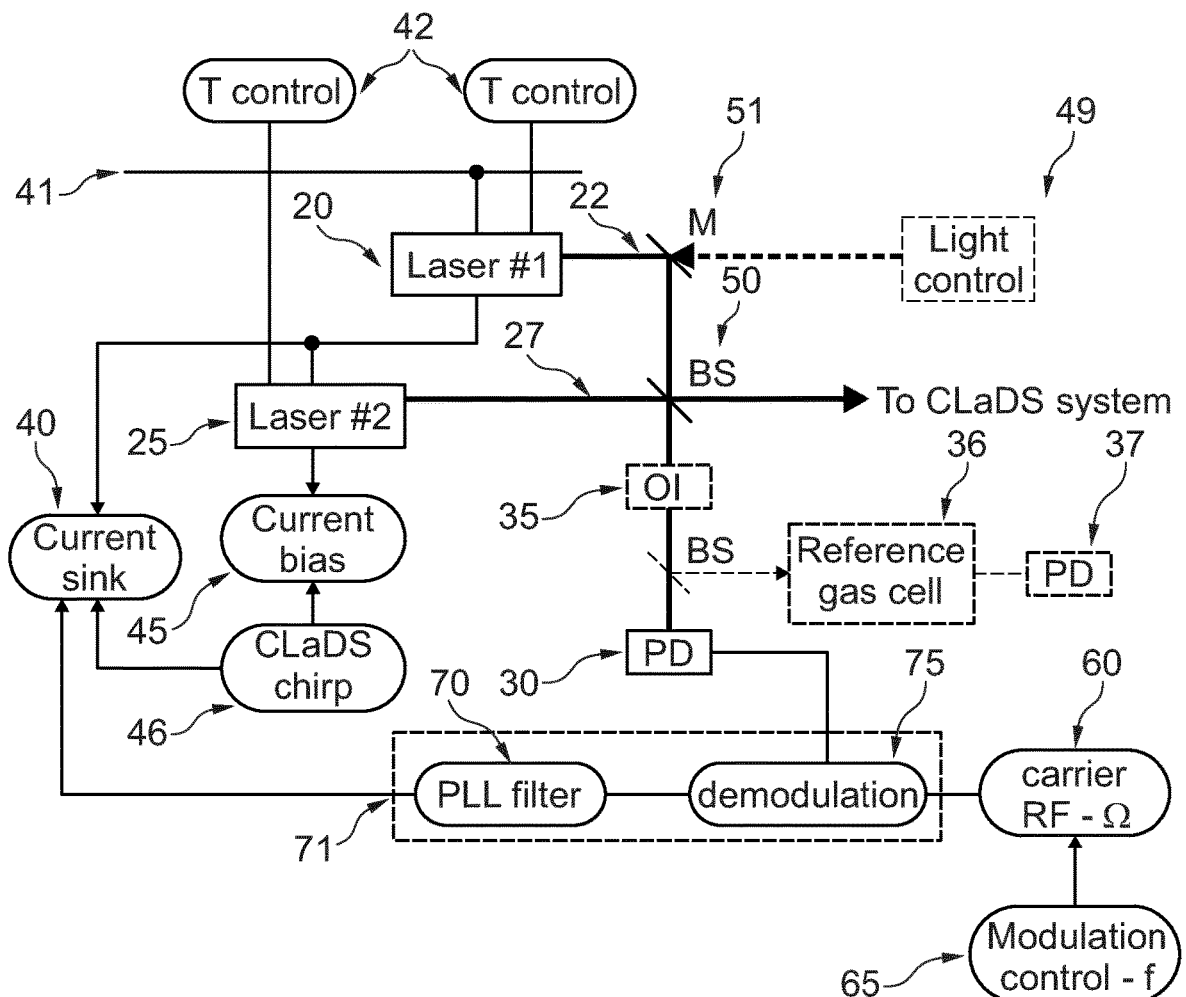
FIG. 5 shows a diagram of an embodiment that is capable of programmable phase modulation.
Figure 6:
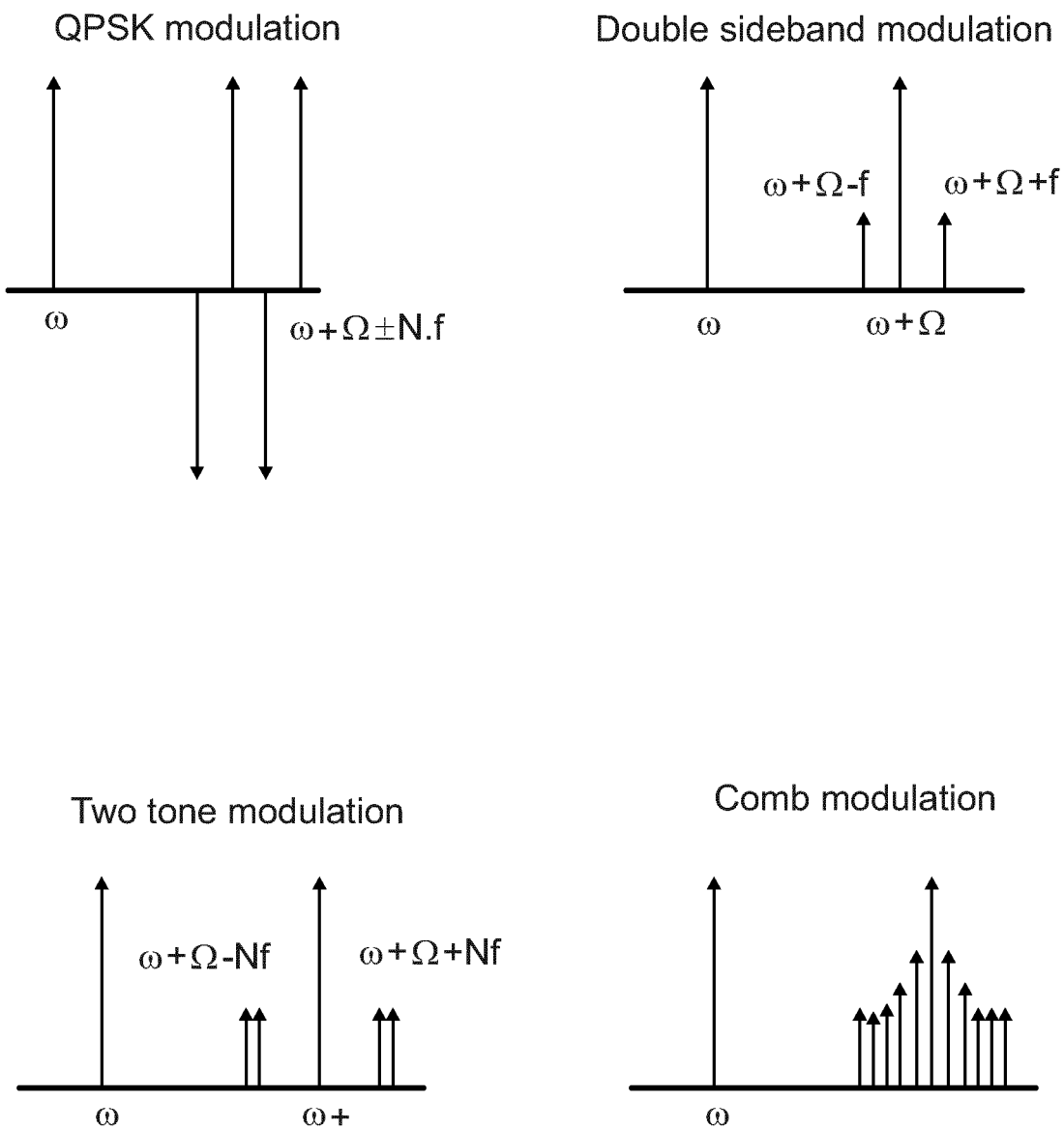
FIG. 6 shows a diagram of the different optical frequency modulation schemes that can be achieved by the programmable phase modulation embodiment.

The phase between the lasers 20,25 can be adjusted arbitrarily in the invention and more complex modulation schemes are possible using a programmable source for the radio frequency signal 60, such as a direct digital synthesiser (DDS) device, or an adjustable radio frequency source such as a voltage-controlled oscillator (VCO). In another embodiment of this invention, shown in FIG. 5, the radio frequency source 60 is modulated digitally by a modulation controller 65, that may be at a nominal frequency f, in a similar fashion to quadrature phase shift keying (QPSK) methods in the communications field. This then allows the modulation scheme in FIG. 6 to be produced, which has better noise immunity properties for the CLaDS signal. The modulation controller can change the carrier frequency up to a rate limited by the OPLL bandwidth with any waveform desired, and therefore create any arrangement of optical frequency sidebands, such as the examples shown in FIG. 6. This includes both digital (discrete) and continuous analogue modulation schemes. For example, continuous sinusoidal modulation at a frequency f (or multiple frequencies) can produce more conventional double sideband modulation, narrow frequency combs, or two-tone frequency modulation. The latter two cases are particularly useful as they allow lower bandwidth photodetectors to be used for the CLaDS detection system, in same way that two tone frequency modulation spectroscopy provides this benefit for absorption laser spectroscopy. Further combinations of this programmable modulation are possible if the polarization modulation is included.

The principle goal of these alternative modulation schemes is to transform the CLaDS signal so that better noise and measurement error immunity is gained by one or combination of; shifting the CLaDS signal in Fourier frequency space; obtaining a differential CLaDS signal that cancels or distinguishes baseline errors; or providing noise modulation that filters out from the CLaDS signal. Often a balance must be made between noise rejection and preservation of the measurand absorption line shape to reduce measurement errors that may originate from fitting of an absorption line model. These various noise rejection techniques have their equivalence in laser absorption spectroscopy methods and equally apply to CLaDS and OPL-CLaDS, as demonstrated by G. Wysocki US20120268746 for CM-CLaDS that has equivalence to wavelength modulation spectroscopy. However, as with laser absorption wavelength modulation spectroscopy, the simple modulation format used results in distortion of the absorption line shape signal, which may lead to measurement errors, particularly when compensating for the effects of pressure, temperature, or background gas collision broadening. The use of a programmable modulation scheme that is possible with OPL-CLaDS allows the noise rejection and dispersion line shape accuracy to both be optimised or corrected.

Figure 7:
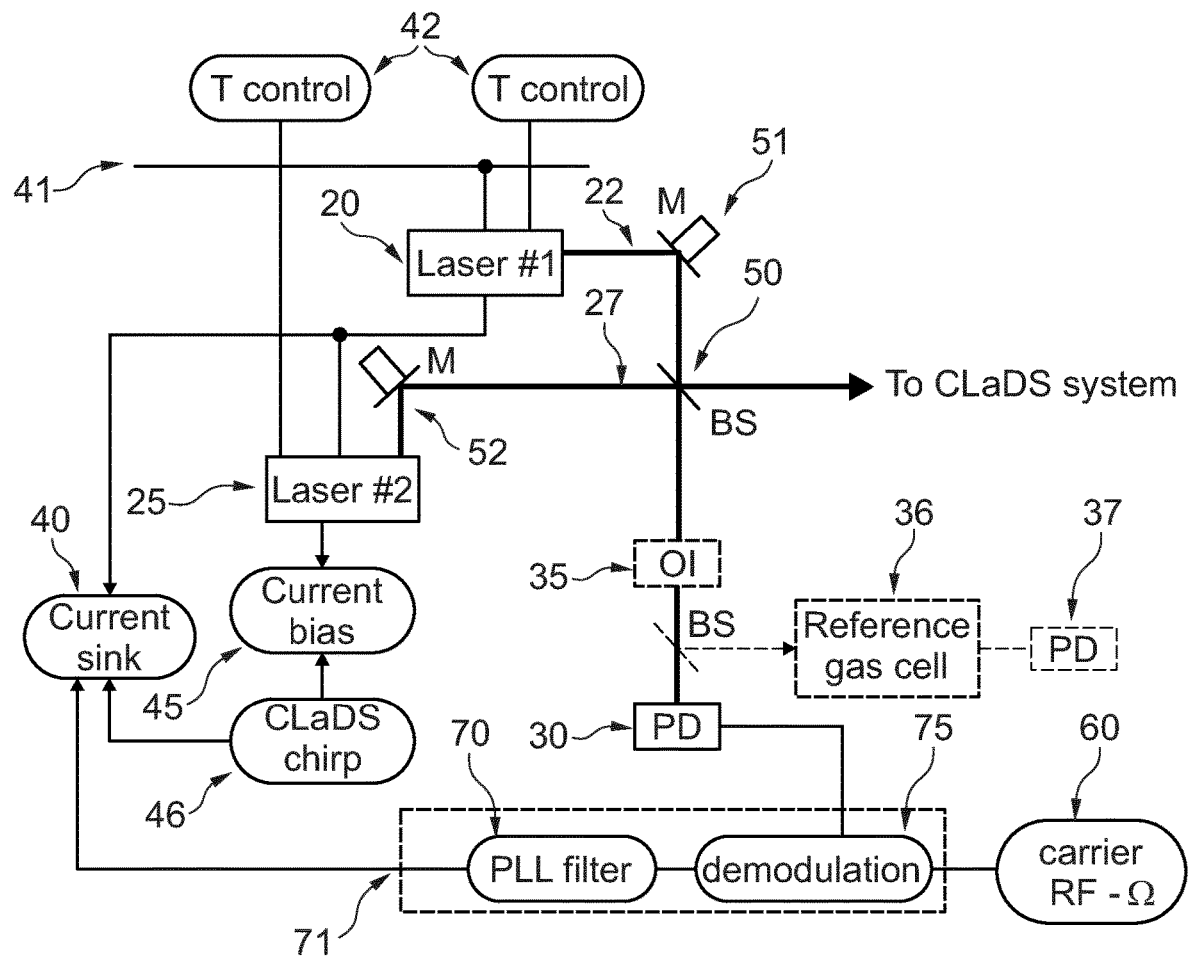
FIG. 7 shows a diagram of an embodiment that is capable of spatial beam phase wave front modulation.

In another embodiment of the invention the phase between the lasers 20,25 may be modulated by changing the path lengths 22,27 since the difference in beam propagation times will induce a phase shift in the optical beat signal at the beam splitter 50. This can be understood since the phase term in Equation 3 is proportional to the path length difference:

$$\varphi_1(t) - \varphi_2(t) \propto \frac{\omega \Delta L(t)}{nc} \quad \text{Equation 13}$$

where $\Delta L(t)$ is the changing path length difference, c is the speed of light, and n is the refractive index of the medium through which the beams propagate, which may be air or an optical waveguide material. Therefore, path length changes of the order of the optical wavelength $\lambda = 2\pi c/\omega$ can modulate the slave laser through action of the OPLL, and such small length changes can be applied very rapidly using a piezoelectric element attached to a suitable mirror 51 for example. Modulation up to ultrasonic frequencies (many 10's of kHz) can readily be applied, which is useful for certain OPL-CLaDS modulation schemes, such as producing a comb of modulation sidebands. Using a more complex mirror such as a digital mirror device (DMD), micro electromechanical system (MEMS) device, or other deformable mirror also allows spatial modulation of the combined beam phase wave front. If a second deformable mirror is added to the OPL-CLaDS system, as shown in FIG. 7 for example, complete modulation of the master and slave laser beam profile and phase wave front can be achieved. This is particularly useful for an open path OPL-CLaDS system as this approach can be used to correct for atmospheric perturbations in the measurement. It also allows for a small amount of beam steering if the overall angle of both mirrors 51, 52 are moved in tandem, within the misalignment limits of the photodetectors 30, 37. Further combinations of modulation scheme are possible if the spatial beam phase wave front modulation is combined with either or both OPL-CLaDS polarization modulation and OPL-CLaDS temporal phase modulation.

Figure 8:
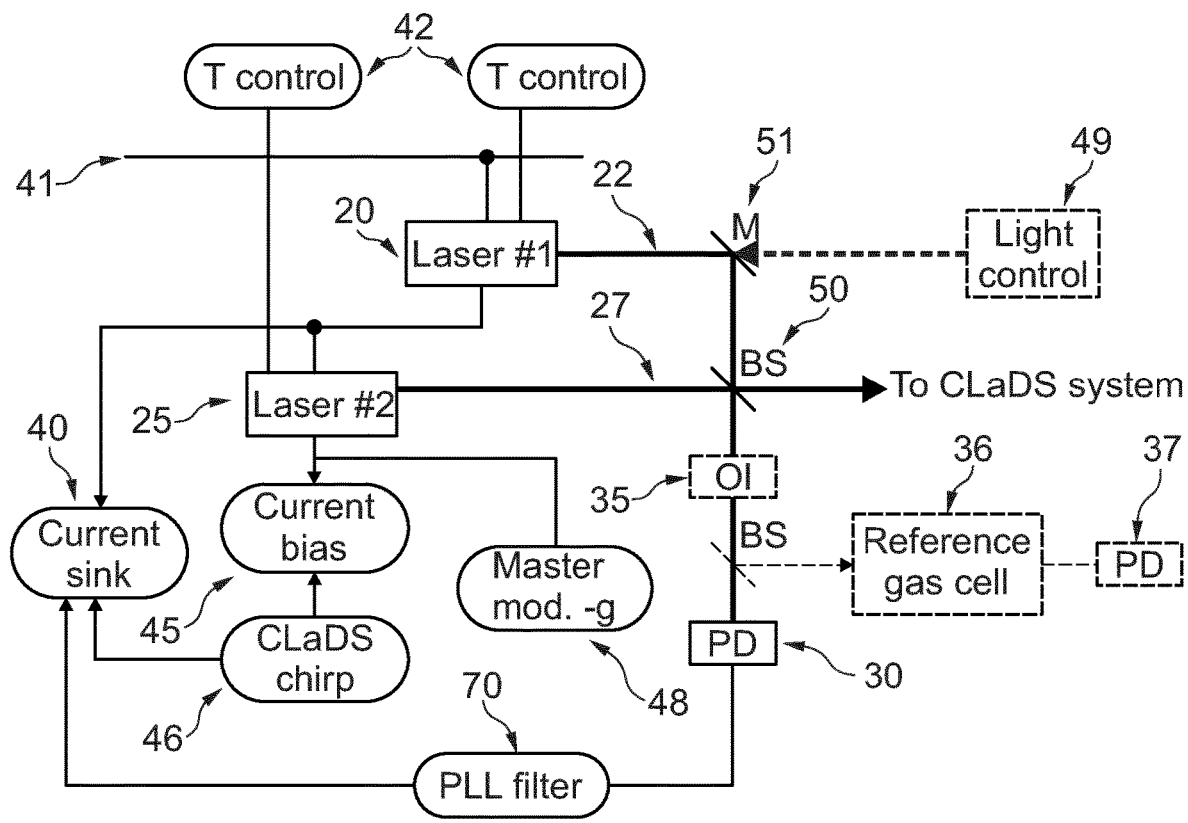
FIG. 8 shows a diagram of an embodiment that used homodyne detection of the optical beat signal, with the inset diagram showing the optical frequency signals produced and used in the homodyne detection.
Figure 8:
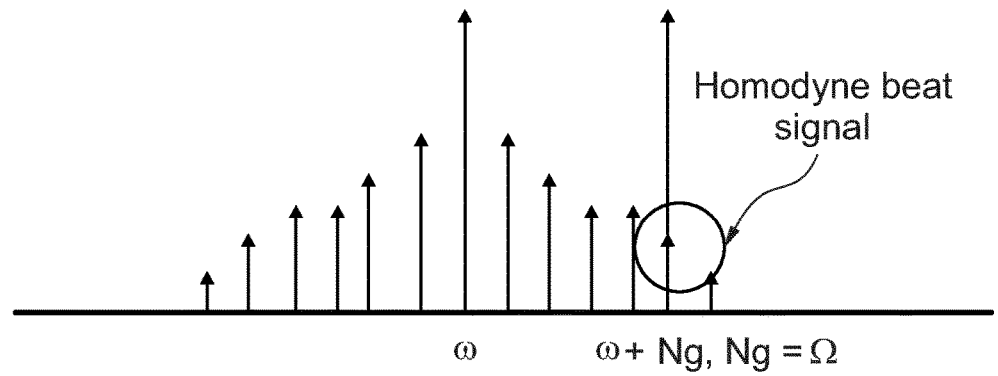

The OPL-CLaDS system can also operate with a homodyne OPLL. This embodiment is shown in FIG. 8, where the master laser 25 is directly modulated by a source 48 so that sidebands are created, where one of these sidebands is mixed with the slave laser 20 beam to create a homodyne optical beat signal. The frequency spacing of the master laser sideband is chosen so that the desired carrier frequency $\Omega$ is obtained from an integer multiple of the master laser modulation frequency g, and having the slave laser 20 temperature nominally tuned to this sideband so it is within the OPLL capture range. This embodiment offers simplification since demodulation with an RF source is not required. However, the loop control bandwidth and CNR requirements are the same as the heterodyne OPLL. Also, the master laser 25 modulation does not have to be efficient as the optical beat note can be produced with very little signal as shown by Equation 12, hence a lower frequency modulation g that is within the modulation bandwidth of the laser can be used with large modulation index to obtain the desired carrier frequency $\Omega$. This is only possible with OPL-CLaDS as direct semiconductor laser modulation to produce a CLaDS or CM-CLaDS signal at the required RF carrier frequencies is extremely difficult due to the diminishing frequency modulation sensitivity at RF frequencies.

Figure 9:
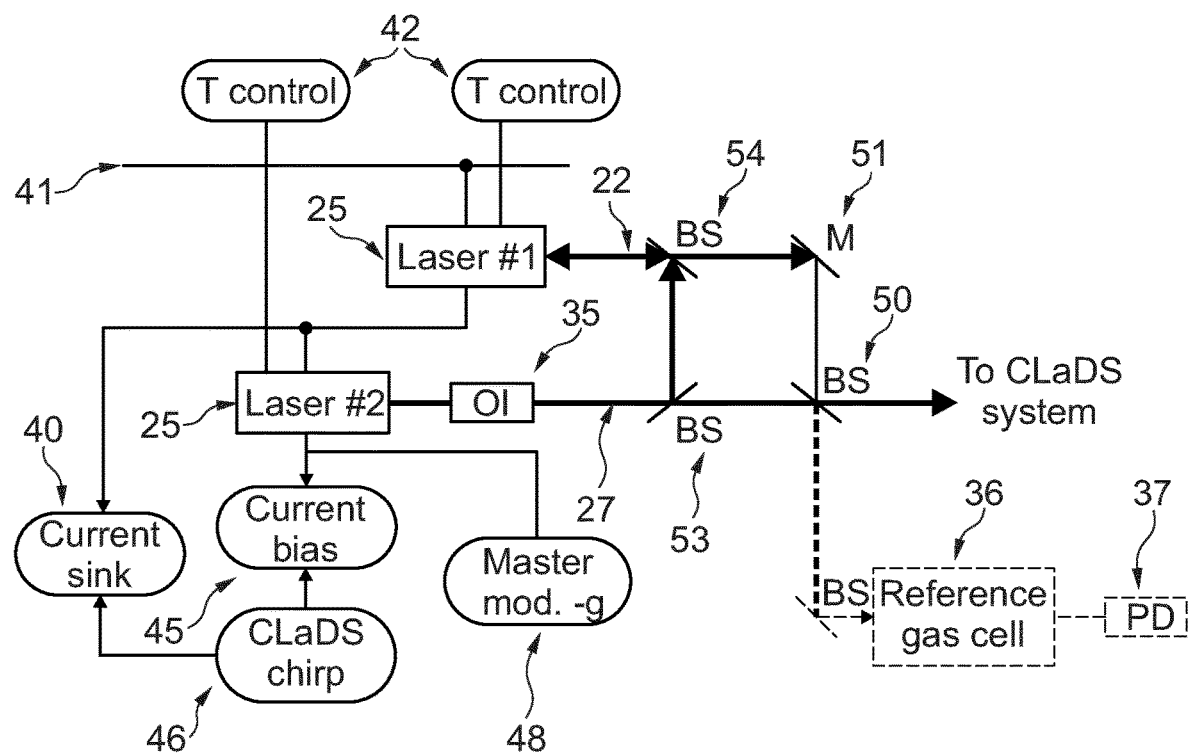
FIG. 9 shows a diagram of an embodiment that uses optical injection locking.

In another embodiment, shown in FIG. 9, the OPL-CLaDS system is implemented using sideband optical injection. Part of the master laser beam 27 is sampled by a beam splitter 53 that is then injected into the slave laser 25 by precise alignment along its beam 22 after another beam splitter 54. An optical isolator 35 in front of the master laser 25 prevents the light from the slave laser interfering with the master laser 25. The remaining beams are combined at the main beam splitter 50 to produce the OPL-CLaDS optical signals. The beam from the other port of the beam splitter 50 may be directed toward an optional reference gas cell 36 and its photodetector 37 to provide more robust stabilization of the lasers 20,25 against wavelength drift. As in the homodyne OPL-CLaDS embodiment, the master laser 25 is directly modulated by a signal of frequency g, which generates a comb of optical sidebands about the master laser 25 optical signal. The slave laser 20 is temperature tuned to one of these sidebands such that the frequency spacing is equal to the desired CLaDS carrier frequency $\Omega$, also an integer multiple of the master laser 25 modulation frequency g. The lasers 20,25 current bias system follows that described in previous embodiments of the invention, including provision of the CLaDS chirp signal.

The frequency locking range of an optical injection locked system is given by:

$$|v_m - v_s| = \frac{1}{4\pi\tau_p}\sqrt{\frac{P_i}{P_s}} \quad \text{Equation 14}$$

where $\tau_p$ is the photon lifetime, and $P_i$, $P_s$ is the injected and slave power that exists inside the laser cavity. Since the photon lifetime of semiconductor lasers is typically a few picoseconds, Equation 14 shows that large frequency locking ranges can be achieved with low levels of master laser 25 injection. For example, 1 microwatt injection into a 10 mW slave laser 20 yields a locking range of approximately 260 MHz, which is more than ten times the OPLL noise bandwidth required for phase coherence and low cycle slipping rate. Optical injection offers a simple method of phase locking, which does not require high speed electronics needed for a negative electronic feedback OPLL. However, the optical alignment requirements are more stringent and the modulation properties are made complicated by the non-linear properties of semiconductor laser injection locking, although the latter is resolved by the common mode bias current supply 45 and current sink 40 scheme that is use to provide the CLaDS chirp signal 46 in this invention. Increasing the optical injection signal coupling to high levels leads to strong non-linear optical effects in the slave laser 20, which produces a four-wave-mixing process and the production of additional modulation sidebands, which can span a frequency range as much as 1 THz as shown by Ch. Koch "Bridging THz-frequency gaps in the near ir by coherent four-wave mixing in GaAlAs laser diodes" Opt. Comm. Vol 91 pp 371-376.

Figure 10:
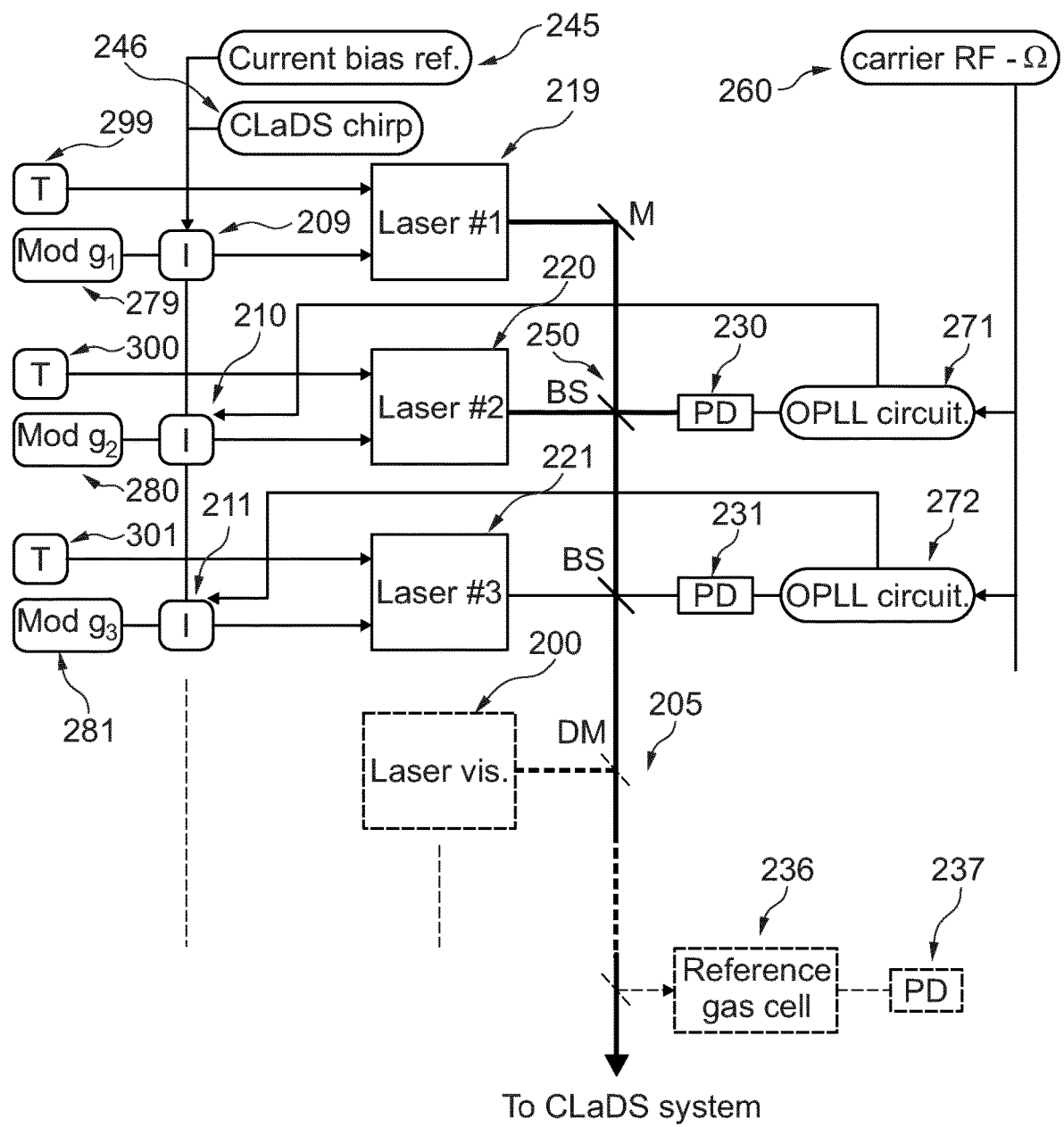
FIG. 10 shows a diagram of an embodiment that has additional lasers combining to form a single output beam.
Figure 10:
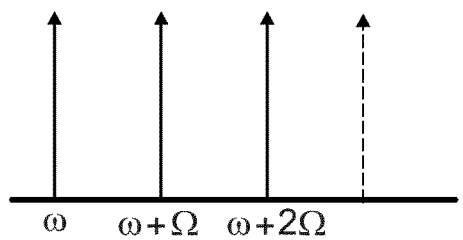

The invention can be implemented with additional lasers so that multiple coherent beams are produced, which may be combined into a single beam or in separate pairs. Such an embodiment is shown in FIG. 10, where all the lasers are phase locked by negative electronic feedback to single master laser 219 and combined into a single beam at the end of the chain of lasers. However, the chain of lasers may include optical injected locked stages also. Each slave laser 220, 221, . . . is combined with the master laser beam at a separate beam splitter 250, 251, . . . . The other beam splitter port is directed to a separate photodetector 230, 231, . . . that detects the optical beat signal used for the slave laser 220, 221, . . . negative electronic feedback control provided by the OPLL circuit 271, 272, . . . . This may be an FPGA or equivalent circuit providing the function of a demodulator and PLL filter as described in the previous embodiment. The RF carrier signal at frequency $\Omega$ may be provided by a common source 260 that is shared by all the slave laser OPLL circuits 271, 272, . . . , and this can produce a number of signals having phases coherent with each other that are widely spaced in frequency and suitable for CLaDS. Each laser 219, 220, 221, . . . may be modulated by an independent modulation control source 279, 280, 281, . . . to allow arbitrary phase modulation schemes (discrete or continuous) as described in previous embodiments. One or more of the additional lasers may be a visible alignment laser 200, which is useful during instrument setup and alignment. An optional reference gas cell 236 and its photodetector 237 may be added for laser stabilisation against wavelength drift. The bias current to master and slave lasers 219, 220, 221, . . . is provided by the same shared current scheme as described in the previous embodiments where there is a common bias or bias reference 245. The in-series shared bias current scheme is suitable when few lasers are used and the voltage across the semiconductor laser chain is not excessive. The circuit required for the shared bias current and connection for modulation and the CLaDS chirp signal is indicated by 209, 210, 211, . . . . For larger numbers the current mirror scheme for in-parallel shared bias current is more practical. Independent temperature control of the lasers 219, 220, 221, . . . is required and this is provided by independent temperature controllers 299, 300, 301, . . . .

Figure 11:
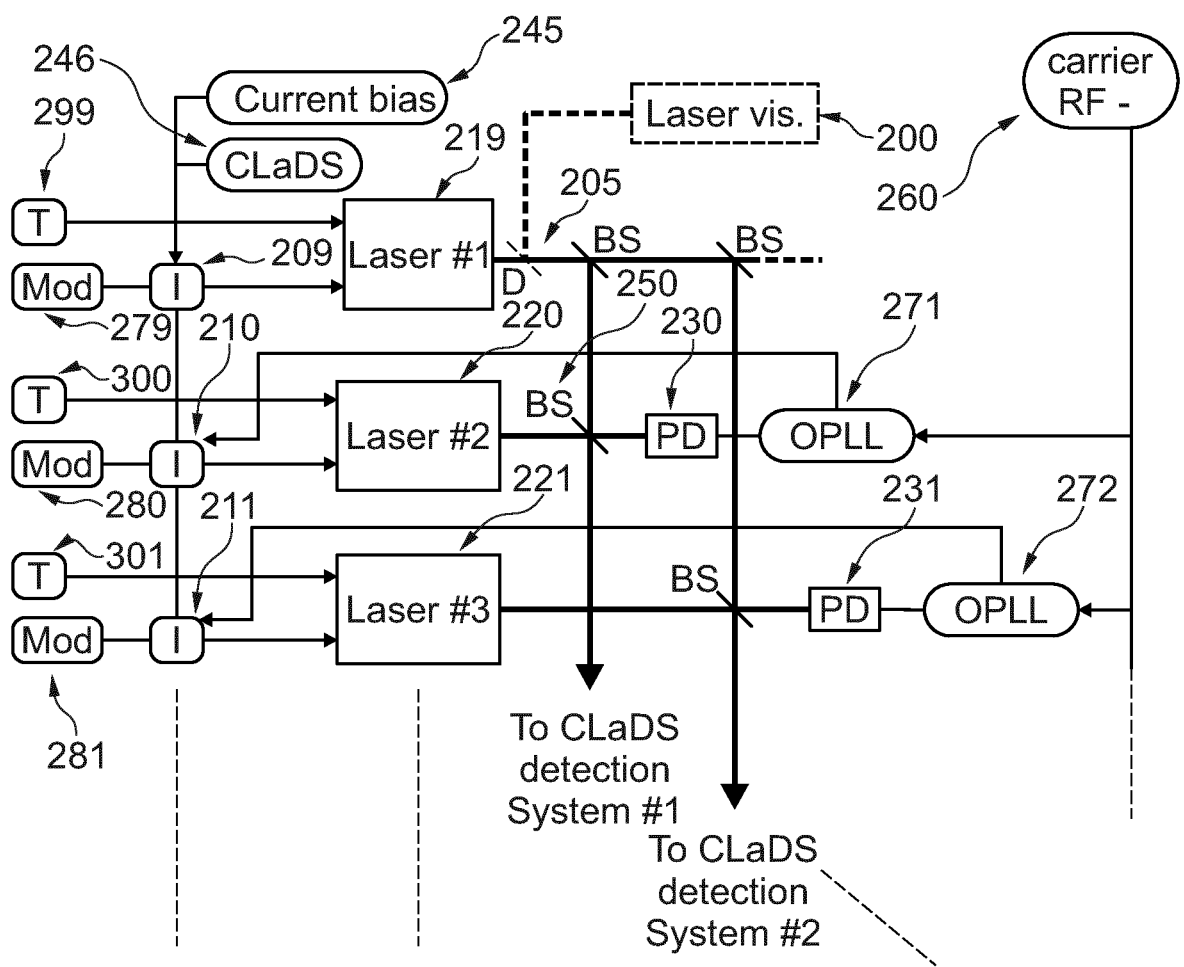
FIG. 11 shows a diagram of an embodiment that has additional lasers to form multiple output beams.

An alternative embodiment of OPL-CLaDS with additional lasers combining the beams into separate pairs is shown in FIG. 11. The beam from the master laser 219 is split with several beam splitters to allow a portion for each OPLL system slave laser 220, 221, . . . . The other port of beam splitter 250 near the slave laser 220 provides the combined master-slave laser beam to an OPL-CLaDS detection system, and likewise for the other slaver lasers 221, . . . . This embodiment is particularly useful for open path CLaDS requiring fixed multiple beam paths for gas mapping applications. A visible alignment laser 200 may be added into the master laser 219 beam path using a dichroic mirror 205 to provide a common alignment beam for all the output beam pairs.

Figure 12:
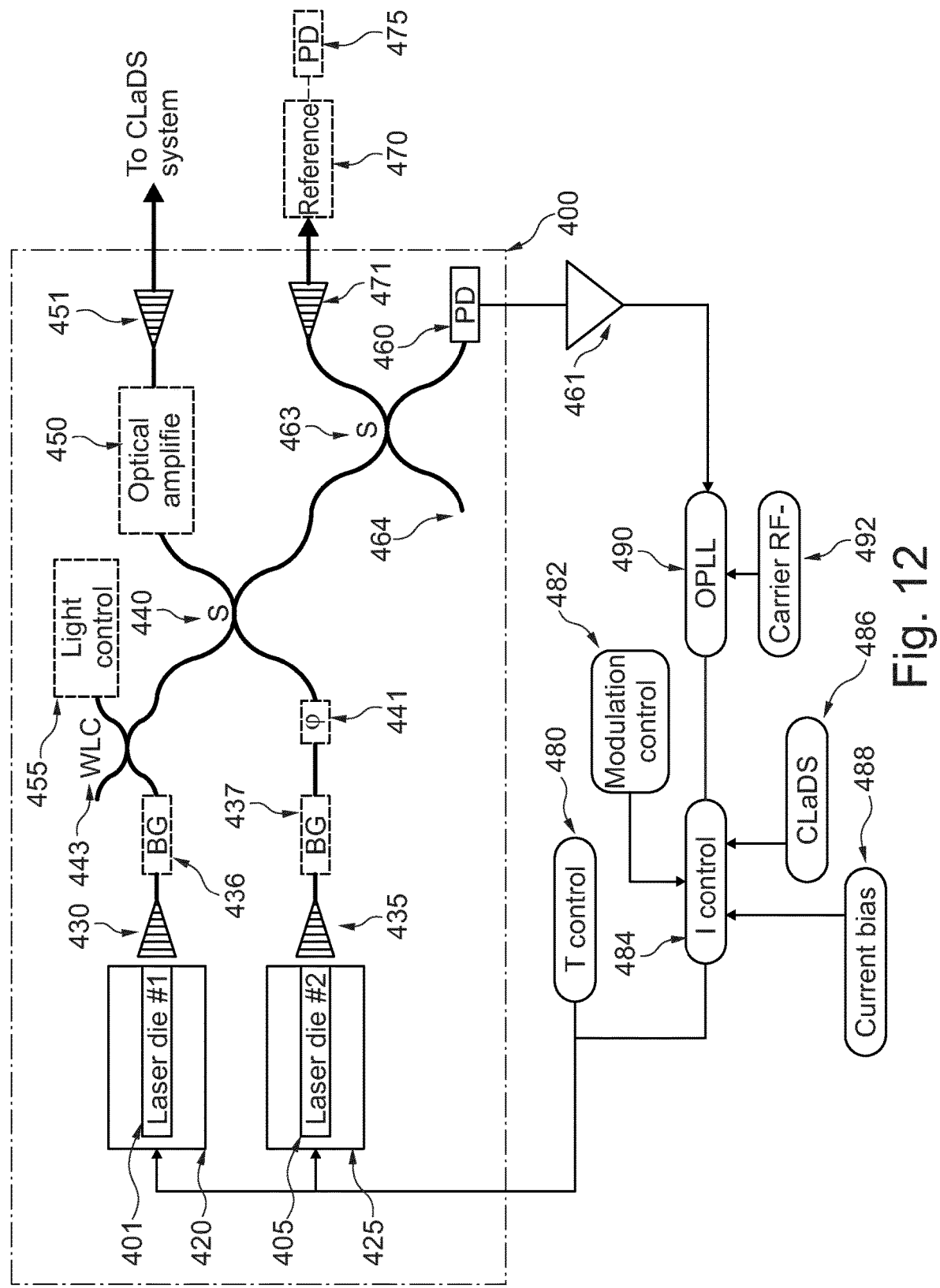
FIG. 12 shows a diagram of an embodiment that is implemented as a photonic integrated circuit.

OPL-CLaDS is well suited to PIC technology and an example of such an embodiment is shown in FIG. 12, where the optical system is integrated onto a photonic substrate 400. It contains the master laser die 405 and slave laser die 401 which are mounted on temperature controlled sub-bases 420,425 (such as a thermoelectric elements) that are regulated by a temperature control circuit 480. The output of the lasers 420,425 are fed in to couplers 430, 435 that are connected to an optical waveguide splitter 440, which performs the same function as the beam splitter 50 in previous embodiments. One output of the waveguide splitter 440 is coupled into another waveguide splitter 463 that connects to a photodiode 460 that detects the optical beat signal, which is fed into an amplifier 461 that provides the electrical signal for the OPLL circuit 490. The carrier frequency $\Omega$ for the heterodyne OPLL is provided by a signal generator 492, and additional lower frequency g modulation signals 482 are fed into the laser current control circuit 484 to achieve any desired phase modulation scheme as described in the previous embodiments. The CLaDS chirp signal 486 is provided in the same manner. The laser current control circuit 484 implements a shared bias current scheme as described in previous embodiments using a current bias reference 488. There may be a partial reflection from the photodiode 460 that may cause optical feedback interference with the lasers 420,425. By appropriate choice of the waveguide splitter 463 ratio some degree of optical isolation can be achieved by this path attenuation, and most of the reflected light will go towards the terminated port 464. The other waveguide splitter 463 port connects to an output coupler 471 that launches a beam, which can be coupled to an optional reference gas cell 470 and its photodetector 475 for laser wavelength drift correction. The reference gas cell may be external to the PIC system using either a free space beam or fibre coupling, so that a gas filled cuvette or gas filled hollow waveguide fibre may be used as an example. The output port of waveguide splitter 440 which feeds to the CLaDS detection system may be via an optical amplifier 450 to boost the signal power, which is useful for open path measurement applications that will benefit from additional beam power. The negative electronic feedback for the OPLL may be provided by direct bias current variation of the slave laser 401 or by non-interfering light injection from an integrated light source 455, such as a laser diode or light emitting diode, which is coupled into the slave laser 401 by a wavelength combiner 443. The OPLL noise bandwidth requirement is reduced substantially if the laser linewidth is reduced significantly, and this may be achieved by adding Bragg gratings (BG) 436,437 to stabilise the laser emission by constructive feedback. In further embodiments, polarization modulation schemes are possible if polarization sensitive waveguide components are used, particularly for the waveguide splitter 440, and path length modulation described in a previous embodiment is possible by integrating a phase shifting element 441 into the PIC, such as a thermal phase shifter.

The OPL-CLaDS apparatus and its embodiments may be also used in such a way to retrieve the measurand absorption signal, rather than the dispersion signal, thereby producing an FMS system that avoids the disadvantages of using a high speed external optical modulator that is typical of many FMS systems. This variation is obtained by retrieval of the amplitude modulation of the carrier signal at the nominal frequency $\Omega$, which is available within the CLaDS detection system after passing through the sample containing the measurand. The phase modulation schemes described in the invention embodiments can also be applied to this FMS system.

The invention claimed is:

1. A chirped laser dispersion spectrometer comprising:
a first tunable laser for providing a first beam at a first wavelength;
a second tunable laser for providing a second beam at a second wavelength;
a bias current supply for the first tunable laser and a bias current supply for the second tunable laser and chirp signal source for the first and second tunable lasers to provide a matching chirp pattern;
a beam combining optical element to produce a single beam from the first and second tunable lasers; and
active-phase locking means to render the phases of the first and second beams coherent with each other and to produce at least one radio frequency carrier signal capable of programmable phase modulation by means of an optical beat signal wherein the phase locking means comprises negative electronic feedback.

2. The chirped laser dispersion spectrometer of claim 1 wherein the bias current supply for the first tunable laser and the bias current supply for the second tunable laser are provided by a common bias current supply.

3. The chirped laser dispersion spectrometer of claim 1 comprising a field programmable logic array (FPGA) device to provide the negative electronic feedback.

4. The chirped laser dispersion spectrometer of claim 1 where the phase locking technique comprises optical injection.

5. The chirped laser dispersion spectrometer of claim 1 which is polarization sensitive and is configured to produce modulation of the combined beam polarization state.

6. The chirped laser dispersion spectrometer of claim 1 comprising a radio frequency reference source that demodulates an optical heterodyne beat signal from a photodetector to create a radio frequency carrier signal.

7. The chirped laser dispersion spectrometer of claim 1 comprising a second modulation source.

8. The chirped laser dispersion spectrometer of claim 7 where the phase locking means comprises negative electronic feedback and wherein the second modulation source has a frequency less than the noise bandwidth of the negative electronic feedback loop and which second modulation source modulates the radio frequency reference.

9. The chirped laser dispersion spectrometer of claim 1 where the radio frequency carrier signal is modulated to produce a phase shift key modulation scheme.

10. The chirped laser dispersion spectrometer of claim 1 where the radio frequency carrier signal is modulated to produce an alternate modulation scheme comprising at least two modulation sidebands.

11. The chirped laser dispersion spectrometer of claim 1 comprising at least one mechanically actuated mirror allowing modulation of the beam path length between the master laser and beam combining optical element.

12. The chirped laser dispersion spectrometer of claim 1 comprising at least one deformable mirror allowing spatial modulation of the combined beam phase wave front.

13. The chirped laser dispersion spectrometer of claim 1 wherein the first tunable laser is adapted to be modulated at a frequency much less than the carrier radio frequency resulting in a comb of sideband frequencies, and further comprising a photodetector that detects an optical homodyne beat signal for negative electronic feedback.

14. The chirped laser dispersion spectrometer of claim 4 wherein the said first tunable laser is an optically isolated master laser that is modulated at a frequency much less than the carrier radio frequency resulting in a comb of sideband frequencies and wherein the second tunable laser is a slave laser that is tuned to optically injection lock onto one of the master laser sideband frequencies or that generated in combination with nonlinear mixing effects within the slave laser.

15. The chirped laser dispersion spectrometer of claim 1 comprising at least one further tunable laser and an arrangement of beam combining optical elements arranged to combine part of the first laser beam with the second slave laser beam and a part of the first laser beam with the further tunable laser beam to produce separate beams.

16. The chirped laser dispersion spectrometer of claim 1 where active phase locking is provided by any combination of negative electronic feedback and optical injection locking.

17. The chirped laser dispersion spectrometer of claim 1 further comprising a reference gas cell and photodetector.

18. The chirped laser dispersion spectrometer of claim 1 further comprising a laser modulation system using optical injection of non-interfering light.

19. The chirped laser dispersion spectrometer of claim 1 further comprising a substrate forming a photonic integrated circuit with waveguide like structures.

20. The chirped laser dispersion spectrometer of claim 1 comprising an optical amplifier.

21. A method for generating at least two optical frequency signals for use in a chirped laser dispersion spectroscopy (CLaDS) process for the detection and/or measurement of molecular species in a gas mixture, the method comprising:
 providing a first laser beam at a first wavelength from a first tunable laser and a second laser beam at a second wavelength from a second tunable laser;
 providing a bias current supply for the first tunable laser and a bias current supply for the second tunable laser and a chirp signal source for the first and second tunable lasers to provide a matching chirp pattern; and
 actively-phase locking the first and second tunable lasers with a phase locking means so as to render the phases of the first and second beams coherent with each other and to produce at least one radio frequency carrier signal capable of programmable phase modulation by means of an optical beat signal wherein the phase locking means comprises negative electronic feedback.

22. A method for generating at least two optical frequency signals for use in a frequency modulation spectroscopy (FMS) process for the detection and/or measurement of molecular species in a gas mixture, the method comprising:
 providing a first laser beam at a first wavelength from a first tunable laser and a second laser beam at a second wavelength from a second tunable laser;
 providing a bias current supply for the first tunable laser and a bias current supply for the second tunable laser and a chirp signal source for the first and second tunable lasers to provide a matching chirp pattern; and
 actively-phase locking the first and second tunable lasers with a phase locking means so as to render the phases of the first and second beams coherent with each other and to produce at least one radio frequency carrier signal capable of programmable phase modulation by means of an optical beat signal wherein the phase locking means comprises negative electronic feedback.

23. A method according to claim 21 wherein the bias current supply for the first tunable laser and the bias current supply for the second tunable laser is provided by a common bias current supply.

24. The chirped laser dispersion spectrometer of claim 1 being used in at least one of Zeeman spectroscopy, Faraday spectroscopy or Stark Effect spectroscopy wherein the beam combining optical element is polarization sensitive and is configured to produce modulation of the combined beam polarization state.

* * * * *